United States Patent [19]

Langhammer

[11] 3,948,641
[45] Apr. 6, 1976

[54] APPARATUS FOR THE CONTINUOUS PRODUCTION OF STEEL FROM ORE

[75] Inventor: Hans-Jurgen Langhammer, Bremen, Germany

[73] Assignee: Klockner-Werke AG, Duisburg, Germany

[22] Filed: Apr. 1, 1974

[21] Appl. No.: 457,123

Related U.S. Application Data

[62] Division of Ser. No. 337,738, March 2, 1973, Pat. No. 3,894,864.

[30] Foreign Application Priority Data
Mar. 4, 1972  Germany............................ 2210468

[52] U.S. Cl. ......................... 75/11; 13/9 R; 75/44 S
[51] Int. Cl.² ....................... C21C 5/52; H05B 7/18
[58] Field of Search............ 75/38, 40, 43, 44 S, 10, 75/11; 266/33 S; 13/9

[56] References Cited
UNITED STATES PATENTS
3,669,434   6/1972   Geck.................................... 266/33
3,708,599   1/1973   Krause.................................... 13/9

Primary Examiner—Peter D. Rosenberg
Attorney, Agent, or Firm—Michael J. Striker

[57] ABSTRACT

Iron ore is continuously converted to steel by introducing the ore into a shaft furnace of substantially equal cross-sectional width and thus forming a column of the charge therein; introducing a reducing gas into the furnace and exposing the bottom portion of the charge column from below to the heat of an electric arc the source of which is centrally disposed in the bottom of the furnace and thus causing the gradual super-heating and melting of the bottom portion of the charge so as to form a dome-shaped cavity at the bottom of the charge column while the column gradually moves downward under the force of gravity and collecting and tapping the formed molten steel at the bottom of the furnace.

20 Claims, 1 Drawing Figure

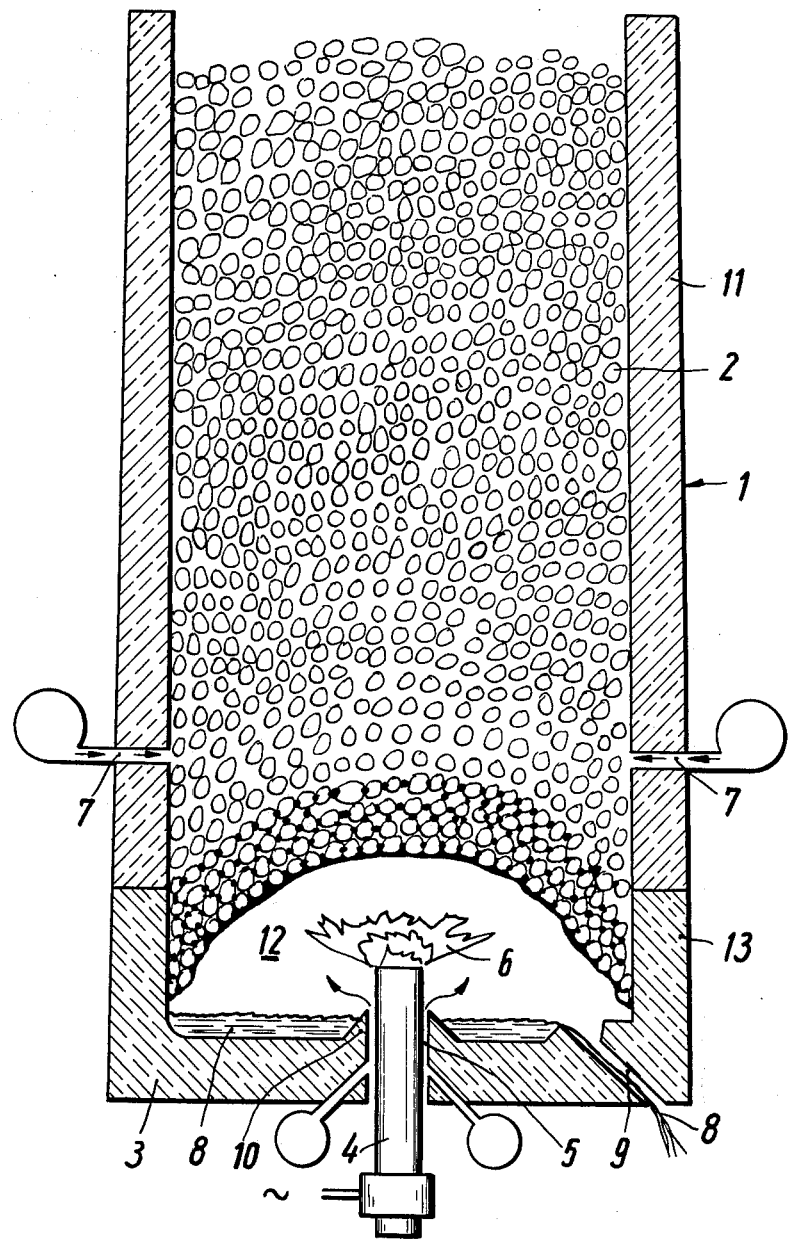

APPARATUS FOR THE CONTINUOUS PRODUCTION OF STEEL FROM ORE

This is a division of application Ser. No. 337,738 filed on Mar. 2, 1973 now U.S. Pat. No. 3,894,864.

BACKGROUND OF THE INVENTION

The invention relates to a continuous process for making steel from ore, pellets, sinter, etc. in a shaft furnace.

Reduction processes are known under the general term "direct reduction processes" whereby ore or pellets are converted to iron and sponge iron. These processes are carried out in various types of apparatus. Best known is the direct reduction process of coarse ores or pellets in a shaft furnace or of fine ore and coal (for instance coke) in a rotary furnace. The final product is sponge iron which usually has a residual contents of unreducible oxygen and in addition contains, in the form of contaminations gangue components of the ore which are not amenable to reduction.

This intermediate product is therefore then usually subjected to a second independent operation where it forms, so to speak, the starting product for scrap iron in the conventional steel production apparatus. Unfavorable in this stage however is the high porosity, that is large surface, which causes a tendency to reoxidation. Extended unprotected storage and melting methods under oxidizing conditions therefore have an undesirable effect.

For the latter reason it is customary to melt down sponge iron formed in a direct reduction process in electro-furnaces. In these electro-furnaces the sponge iron is preferably fed into the furnace in a continuous charge as distinguished from the conventional discontinuous bucket charge.

It is therefore an object of the invention to provide for a process wherein sponge iron which has been produced as customary in a shaft furnace can be melted down in the same apparatus in a continuous operation and can be discharged as steel.

SUMMARY OF THE INVENTION

According to the basic concept of the invention a charge column is formed in the shaft furnace which after reduction by reducing gas is exposed from its bottom side to a centrally arranged electric arc, the heat of which covers most of the cross section of the bottom portion of the column. In this form the bottom portion is subjected to melting and super-heating thus forming a domed cavity the roof of which supports the charge column while the column gradually moves down under the force of gravity.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing in a diagrammatic form shows a shaft furnace for use in the method of the invention in cross-sectional view.

DETAILS OF THE INVENTION AND PREFERRED EMBODIMENTS

The invention permits the melting of the sponge iron and conversion to steel in the same shaft furnace in which the sponge iron has been made from the original ore. In addition it avoids the two step process consisting of a reduction stage and a melting and steel conversion stage and permits the melting process which is at present carried out discontinuously to be effected in a continuous operation.

The process results in considerable saving in heat supply and energy because the usual cooling down of the sponge iron from the temperature of the reduction stage and the subsequent reheating up to the melting stage is carried out in one and the same process and without any intermediate cooling between the two stages. Besides reoxidation can be avoided by melting the sponge iron under reducing conditions immediately after the reduction. Furthermore all apparatus for discharging and supplying the iron ore from the reduction stage and transferring it into the melting stage can be dispensed with. In addition all necessary additives for the final steel composition can be added simultaneously with the ore and partly even in the form of oxides.

A specific embodiment of the invention provides for the introduction of the reducing gases in part peripherally to the charge column and in part directly into the melting cavity which forms during the process so that the latter gas there is subject to additional heating.

Another embodiment of the invention contemplates sealing of the apparatus and thus maintaining of a reducing atmosphere by introducing additional reduction gas or an inert gas through a gap formed around the seat of the electrode in the floor of the furnace.

It is preferred to add all alloy components which are necessary for the final steel composition in a uniform and continuous operation during the process. Furthermore the limestone for the gangue or the coal or coke for the alloy or for the reduction step and reducible alloy oxides can likewise be introduced in a continuous and uniform operation during the entire process.

It is furthermore possible in the process of the invention to interconnect the melt performance, that is the supply of heat by means of a specific amount of electric energy, and the amount of introduced reduction gas.

The process of the invention causes the burning out of a dome-shaped cavity under the action of the heat of the electric arc. The surface of the dome then is subject to gradual melting in the form of an inverted bowl and continuously reforms under the action of the downwardly moving charge column which is caused to move by the force of gravity.

The portions of the sponge iron which are in the reduction zone directly above the bottom portion of the charge column will gradually be welded together prior to being molten. This occurs under the action of the downwardly increasing temperature. The welding together of the iron particles will occur at their contact points and thus a firm support structure of arch-shaped design will form at the lower end of the charge column. This vault structure has sufficient strength to support the charge column lying above and to reform itself by a continuous process.

By introduction of part of the reducing and fuel gases from the outside in a peripheral direction and introducing part of the gases directly into the melt cavity it is possible to superheat the reduction gases directly or indirectly by the heat of the electric arc. The amount of heat thus absorbed is then passed on in countercurrent to the higher portions of the change column and is taken up in the reduction process.

The invention contemplates that the reduction gases may also be introduced through a gap between the adjustable electrode structure for the electric arc and a dam-like elevation formed in the bottom of the furnace. This dam thus forms an annular basin of which the inner wall, that is the wall portion surrounding the aperture of the ring structure surrounds the electrode leaving a gap between the wall and the electrode. By introduction of the reducing gases through this gap or if desired by an inert gas the electrode itself is protected against metal splattering from above. Besides this structure also helps to maintain the reducing atmosphere particularly since the chimney effect of the shaft furnace system by itself has an efficient sealing effect against exterior air entry.

Contrary to conventional steel production processes substantial savings are possible in the refractory lining of the furnace. The accumulating metal which flows down from the column constitutes itself a protection of the floor of the furnace and the column itself protects the side walls. Only the dam-like elevation around the electrode is exposed to the heat of the electric arc. All other refractory portions of the furnace are protected against overheating by means of either liquid or solid metal.

It is therefore possible to make only the bottom portion of the furnace from high quality refractory materials. All other portions of the shaft do have to withstand only the comparatively low temperature attach of the reduction gas. This means that the larger part of the furnace can be formed of fire clay type materials while only the lowermost portion should be made of basic magnesite or dolomite or of an acidic refractory which has a high alumina contents.

The continuous operation results in a high performance relative to the surface of the hearth or total furnace space, which compared with the conventional discontinuous steel production process requires only comparatively small furnaces and thus a reduced cost in investment and maintenance.

The continuous operation and the complete enveloping of the heat source by the melting metal result in ideal heat transfer conditions which contrary to the discontinuous steel production processes do not deteriorate in the course of the conversion of a particular charge. This permits to increase the comparatively high heat effect of above 70% as it is obtained in the melting process in the electro-furnaces in case of the discontinuous operation to an amount in excess of 90% with the continuous operation of the invention. This is possible because the only loss of heat in this case will occur through the wall and this can be avoided by sufficient insulating materials.

The invention also embraces an apparatus for carrying out the process. Broadly, the apparatus comprises a shaft furnace which is open at the upper end and which has a floor through which an electrode penetrates while an annular gap is formed around the electrode. The shaft furnace has a substantially equal cross-sectional width or has at most a width which increases slightly towards the bottom. It has smooth wall portions, that is all protruding or direction changing extensions of the inner wall are avoided, to permit the uniform and continuous movement of the charge column under the action of gravity.

It is important also in the apparatus that a dam-like elevation at the bottom made of refractory material forms a basin for the molten steel and thus separates the adjustable arc electrode from the steel.

As already indicated it is a further characteristic of the apparatus that only the lowermost shaft portion which is directly exposed to the heat of the electric arc is lined with high quality refractory material while the remainder is formed only of regular refractories.

A specific embodiment also contemplates that the tap hole is in the area exposed to the heat of the electric arc. The height of the dam-like elevation will determine the depth of the sump or basin for the metal on the floor. Thus the residence time and amount of heating exposure can be adjusted as desired by changing the height of the dam-like elevation.

It is also preferred that the tap hole and the connection to a receiving tank for the molten steel be sealed against the effects of exterior oxidizing atmosphere.

With reference to the drawing which shows a particular embodiment of the apparatus it will be seen that 1 is a shaft furnace which is in its upper portion is filled with ore and alloying elements and conventional additives. Electrode 4 penetrates through the floor 3 of the furnace. An annular gap 5 is formed around the electrode. Through the gap, reducing gas, for instance natural gas, may be blown into the melt space 12. Thus the reducing gas is heated by the arc 6 emanating from the electrode and will flow in countercurrent to the charge column 2. Further reducing gas, for instance natural gas, may be introduced through the peripheral openings 7 into the charge column.

The ore is thus converted to sponge iron in the lower part of the charge column, that is in the part which is opposite the electric arc. The sponge iron particles will be welded together at their multiple points of contact. Thus a firm support structure for the charge column 2 will be formed. The steel 8 which accumulates on the floor of the furnace is discharged through a tap hole 9. The wall-shaped elevation 10 on the floor surrounds the electrode and thus prevents the liquid steel from penetrating into the gap 5 between the electrode and the floor. The lower section 13 of the furnace 1 is here composed of a highly refractory material while the upper section 11 of the furnace 1 is here composed of a material of average fire resistance.

EXAMPLE

In order to perform the method according to the invention ore in form of pellets, having a metallic iron content of 67.9 %, is used. This ore consists of 96 % $Fe_2O_3$ and 4 % $SiO_2$ and impurities. The ore-column is preheated to 900° C by means of hot reducing gases. The reducing gases consist of 49.2 % $H_2$, 43.6 % CO, 1.2 % $CO_2$, 1.2 % $H_2O$, 2.3 % $CH_4$ and 2.3 % $N_2$.

By means of this reducing gas the ore is reduced to sponge iron, consisting of 94.8 % metallic iron, 1.35 % $SiO_2$ and 3.85 % $O_2$ and impurities.

For the production of 1000 kg metallic iron 1396 kg ore (pellets), 50 kg lime and 1530 $Nm^3$ reducing gas are needed. 20 percent of the reducing gas are admitted through the annular gap, being formed around the electrode.

The energy being necessary for heating and melting from 900° C to 1600° C amounts to 268 kWh per metric ton of metallic iron, on basis of a thermal efficiency of 85 percent.

For the production of 20 metric tons of steel per hour 27,920 kg ore and an electrical energy of 5494 kWh are necessary as well as a transformer having at least a power of 5.77 MW.

The shaft furnace has an interior diameter of 2.5 m. The height of the reduction zone amounts to 8 m, while the melting zone has a height of 2 m. The molten material forms a bath having a depth of 200 mm.

The liquid material produced by the melting of the pellets must be allowed in order to get a steel quality of 0.15 % C, 0.60 % Mn, 0.20 % Si and 0.03 % Al, These alloying elements are:

| | |
|---|---|
| 0,7 kg coal | per metric ton of steel |
| 3 kg FeSi with a Si-content of 75 % | '' |
| 7,8 kg FeMn with a Mn-content of 80 % and 7 % C | '' |
| 1,7 kg Al | '' |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for the continuous production of steel from charges which include a substance selected from the group consisting of ore, sinter and pellets, comprising wall means, including an at least approximately vertical circumferential wall and a transversely extending lower wall which together bound an upright melting zone adapted to contain a charge which descends therein by gravity from an upper portion to a lower portion of the zone; an upright passage in said transversely extending lower wall and communicating with said lower portion of said zone; an electrode extending through said passage and having an end portion from which an electric arc is directed at the bottom end of said charge so that said bottom end is continuously melted as said charge descends by gravity into said lower portion of said zone; and an opening in said wall means for the substantially continuous evacuation of the resulting molten material from said lower portion of said zone.

2. An arrangement as defined in claim 1, wherein said lower wall is provided with a projection which extends circumferentially of said electrode so as to prevent molten material which flows to said lower wall from contacting said electrode.

3. An arrangement as defined in claim 1, wherein said passage is substantially centrally arranged in said lower wall.

4. An arrangment as defined in claim 1, wherein said opening is provided in said lower wall.

5. An arrangement as defined in claim 1, wherein said circumferential wall is arranged so that said zone has an open upper end for the introduction of a charge into said zone.

6. An arrangement as defined in claim 1, wherein said circumferential wall has a substantially smooth interior surface.

7. An arrangement as defined in claim 1, wherein said electrode extends through said passage with clearance so that a substantially annular gap is defined between said electrode and said lower wall; and further comprising means for introducing gas into said gap.

8. An arrangement as defined in claim 1, wherein said circumferential wall is provided with at least one inlet opening for the introduction of gas into said zone peripherally of the latter; and further comprising means for admitting a stream of gas into said inlet opening.

9. An arrangement as defined in claim 1, wherein said electrode is adjustably mounted so as to permit regulation of the depth of penetration of said end portion into said zone.

10. An arrangement as defined in claim 1, wherein said zone is of substantially uniform cross section.

11. An arrangement as defined in claim 1, wherein said zone is of downwardly and outwardly flaring configuration.

12. An arrangement as defined in claim 1, wherein means is provided for collecting molten material in said zone.

13. An arrangement as defined in claim 12, said opening being provided in said lower wall; and wherein said collecting means comprises a projection which is provided in said lower wall adjacent said opening so as to form a collecting space for molten material in said lower wall.

14. An arrangement as defined in claim 13, said collecting space having a bottom surface, and said opening being at a level higher than said bottom surface.

15. An arrangement as defined in claim 13, said collecting means being effective for permitting superheating of molten material collected in said zone prior to evacuation of the molten material from said zone; and wherein the height of said projection is selected so as to obtain a depth of said collecting space which corresponds to the residence time desired for the molten material in said zone.

16. An arrangement as defined in claim 13, wherein said collecting means comprises an additional projection which is provided in said lower wall and extends circumferentially of said electrode.

17. An arrangement as defined in claim 1, wherein said wall means includes a section in the region of a lower end of said zone which comprises a highly refractory substance, the remainder of said wall means comprising material of average fire resistance.

18. An arrangement as defined in claim 17, wherein said highly refractory substance comprises a substance selected from the group consisting of acidic refractories having a high alumina content, basic magnesite and dolomite, said material comprising average fire clay.

19. An arrangement as defined in claim 1, wherein said opening is arranged for direct exposure to the heat emanating from said end portion of said electrode.

20. An arrangement as defined in claim 1; further comprising a receiving tank for the molten material evacuated from said zone, and means for connecting said opening with said receiving tank; and wherein said opening, said connecting means and said receiving tank are sealed against penetration by oxygen from exteriorly of said zone.

* * * * *